(12) United States Patent
Frigeri

(10) Patent No.: US 12,540,889 B2
(45) Date of Patent: Feb. 3, 2026

(54) MICRORHEOLOGICAL MEASUREMENTS IN A VISCOELASTIC MEDIUM

(71) Applicant: IMPETUX OPTICS, S.L., Barcelona (ES)

(72) Inventor: Paolo Antonio Frigeri, Origlio (CH)

(73) Assignee: IMPETUX OPTICS, S.L., Barcelona (ES)

( * ) Notice: Subject to any disclaimer, the term of this patent is extended or adjusted under 35 U.S.C. 154(b) by 286 days.

(21) Appl. No.: 18/446,791

(22) Filed: Aug. 9, 2023

(65) Prior Publication Data

US 2023/0384196 A1 Nov. 30, 2023

Related U.S. Application Data

(63) Continuation of application No. PCT/EP2022/053645, filed on Feb. 15, 2022.

(30) Foreign Application Priority Data

Feb. 15, 2021 (EP) ..................................... 21382121

(51) Int. Cl.
*G01N 11/16* (2006.01)
*G01N 11/00* (2006.01)

(52) U.S. Cl.
CPC ........ *G01N 11/16* (2013.01); *G01N 2011/008* (2013.01)

(58) Field of Classification Search
CPC .. G01N 11/16; G01N 2011/008; G01N 15/02; G01N 15/0205; G01N 15/1433; G01N 21/718; G01N 25/482; G01N 33/48728; G01N 2015/1006; G01N 2201/06106; G01N 2015/1028; G01N 1/28; G01N 2035/00237; C12Q 1/02; C12Q 1/24; G02B 21/32
USPC ... 73/54.01, 54.23, 64.56, 61.71–61.75, 863, 73/865.5; 356/36, 335, 224, 436–442
See application file for complete search history.

(56) References Cited

U.S. PATENT DOCUMENTS

| 8,637,803 | B2 | 1/2014 | Montes Usategui et al. |
| 2018/0202913 | A1 | 7/2018 | Tanner et al. |

FOREIGN PATENT DOCUMENTS

| CN | 1334443 A | * | 2/2002 | |
| EP | 3678146 A1 | * | 7/2020 | ............... C12Q 1/68 |
| WO | 2010010121 A1 | | 1/2010 | |
| WO | WO-2020130812 A1 | * | 6/2020 | ............. G02B 21/06 |

OTHER PUBLICATIONS

International Search Report and the Written Opinion, PCT/EP2022/053645, Mar. 7, 2022, 17 pages.
(Continued)

*Primary Examiner* — Robert R Raevis
(74) *Attorney, Agent, or Firm* — Edell, Shapiro & Finnan, LLC

(57) ABSTRACT

A method and apparatus for performing microrheological measurements in a viscoelastic medium by employing at least two optical traps, generated from a single laser source, acting on a single particle located in viscoelastic medium. The method uses an improved back-focal-plane interferometry (BFPI) procedure to obtain the complex shear modulus of the medium.

16 Claims, 1 Drawing Sheet

(56) References Cited

OTHER PUBLICATIONS

Impetux: "SENSOCELL optical tweezers: Application examples overview. By IMPETUX.", Youtube, Oct. 16, 2019, Retrieved from the Internet: URL:https:// https://www.youtube.com/watch?v=rFmpKMImdpQ, showing applications "Cell stretching" and "Microrheology", 1 page.

Gieseler et al., "Optical Tweezers: A Comprehensive Tutorial from Calibration to Applications", Arxiv.org, Cornell University Library, 201 Olin Library Cornell University Ithaca, NY 14853, Apr. 11, 2020 (Apr. 11, 2020), chapter 4.3 Microrheology, 149 pages.

Impetux: "SENSOCELL webinar—Main features & Applications. By Impetux and Axiom Optics", YouTube,Oct. 26, 2020, p. 1, Retrieved from the Internet: https://www.youtube.com/watch?v=QIV716JDZGO "SENSOCELL overview." and "Application Examples." sections, 1 page.

* cited by examiner

MICRORHEOLOGICAL MEASUREMENTS IN A VISCOELASTIC MEDIUM

CROSS-REFERENCE TO RELATED APPLICATIONS

This application relates to and claims the benefit and priority to International Application No. PCT/EP2022/053645, filed Feb. 15, 2022, which claims the benefit and priority to European Patent Application No. EP21382121.8, filed on Feb. 15, 2021.

FIELD

The present disclosure relates to a method and device for performing microrheological measurements in a viscoelastic medium by employing at least two optical traps acting on a single particle located in the viscoelastic medium.

BACKGROUND

Optical tweezers (or optical traps) are highly focused lasers that allow trapping particles in a suspension medium without any physical contact with the object. Using a high-magnification lens, such as a microscope objective, the laser beam focused at the focal plane of the lens can exert attractive forces on micron-sized objects. By deflecting the laser, the particle can also be displaced within the suspension medium.

The manipulation capabilities of the technology can be further increased by the use of some device capable of modifying the wavefront of the beam such that several optical traps are generated at the sample starting from a single laser source. This allows designing more sophisticated experiments where several particles are manipulated simultaneously or a single large object is held at different points. Devices used to produce multiple traps are divided into two groups: those that create several simultaneous traps, for example by separating the beam by polarization, and those that are able to switch the position of the laser beam between several positions at high speed, for example by using an acousto-optic deflector (AOD), so that different traps are effectively created by time-sharing the beam energy. These techniques can be used in combination with a technique often known as back-focal-plane interferometry (BFPI) to measure the force applied by the laser beam on the particle as well as the displacement of the trapped particle.

In an improved BFPI procedure, like that of U.S. Pat. No. 8,637,803 B2, a condenser lens is used to capture the light scattered and not scattered by the particle and to project such light onto a photodetector that provides voltages proportional to the particle displacement in the optical trap. The proportionality constant depends on the shape of the particle, on its optical properties and on those of the medium.

The force applied by an optical tweezers on a trappable object or particle can be shown to be proportional to the (small) displacements from the equilibrium position of the object, i.e., the trapping potential well of the optical trap can be considered quadratic at its bottom. In the tree-dimensional case the quadratic potential is in general an elliptic paraboloid, with three principal axes. In case of a Rayleigh regime, valid for particles smaller than the wavelength of the laser beam (e.g., if wavelength lambda=1064 nm, the particle should be smaller than 1 um), one of the principal axes is oriented along the propagation direction of the focused laser beam forming the trap. This direction is identified with the z axis of an orthogonal system of reference. The direction of the others two principal axes, x and y, depends on the intensity profile of the laser beam, the principal orientations of which are used to define the x and y axes. In case of larger particles, the orientation of the principal axes depend in general on both the intensity profile of the optical trap and the shape of the particle. However, in practice, the shape of the particle, or at least its orientation, is chosen to guarantee that their orientations match with that described for the Rayleigh regime. This is the case with spherical particles or with particles having z-axial symmetry.

The constant of proportionality between the force exerted by the laser beam on the particle and the position x of the laser focus with respect to the "optical" center of the particle (i.e., the point inside the particle on which the laser beam does not apply any force) is known as trap stiffness K. In general K is a matrix that becomes diagonal by choosing the three principal axes of an elliptic paraboloid representing the quadratic potential of the optical trap as the directional axes of a preferred reference system used to represent position vectors d with respect to the optical center and force vectors F. In this case the following relationships hold: $Fx=K_x \cdot x$, $Fy=K_y \cdot y$, $Fz=K_z \cdot z$, where $d=(x, y, z)$ and $F=(Fx, Fy, Fz)$.

The photodetector used in the BFPI procedure is also oriented by taking the principal axes as reference so as to obtain two voltages (Vx, Vy) proportional to (x, y).

As mentioned above, an improved and preferred BFPI procedure is disclosed in U.S. Pat. No. 8,637,803 B2. In this procedure, a high-numerical-aperture lens positioned so as to capture most of the laser beam scattered by the particle projects the light onto a particular type of photodetector that provides signals proportional to the beam deflection. By using this optimized version of BFPI, the voltage provided by the detector is a direct measure of the optical force applied by the optical trap on the particle. In this case the constant of proportionality between voltage and force results to be absolute, i.e. independent of the physical characteristics of the particle. This direct force measurement makes also simpler and more precise the estimation of Kx or Ky than using a generic BFPI procedure needing the utilization of a "passive" calibration technique to determine K. The "passive" methods become very imprecise compared to the improved BFPI method in order to estimate K for a particle embedded in a highly viscous medium.

The precise knowledge of the force F and the consequent displacement xp of the particle is needed when using optical tweezers for microrheological studies.

SUMMARY

In a first aspect, a method for performing microrheological measurements in a viscoelastic medium employs at least two optical traps acting on a single particle located in said medium and comprises the steps of:
choosing the particle to be stiffer than the medium;
placing the particle within the medium;
generating a single laser beam from a single laser source;
dividing the single laser beam into a first laser beam and a second laser beam;
producing a first optical trap acting on the particle by focusing the first laser beam therein;
producing a second optical trap acting on the particle by focusing the second laser beam therein;
positioning the first and second optical traps at the optical center of the particle;
displacing the second optical trap out of the optical center of the particle on a time-dependent motion;

using back-focal-plane interferometry (BFPI) with a photodetector in order to acquire a first temporal series for the voltage signal $V1(t)$ representative of the force exerted by the first optical trap on the particle;

using BFPI with the photodetector to acquire a second temporal series for the voltage signal $V2(t)$ representative of the force exerted by the second optical trap on the particle;

computing the force exerted by the first and second optical traps on the particle as the temporal series $F(t)=a\cdot(V1(t)+V2(t))$, where a is a proportionality constant depending on the shape of the particle, on the optical properties of the particle and on the optical properties of the medium;

computing the displacement $xp(t)$ of the particle as the temporal series $xp(t)=-a\cdot V1(t)/k$, where k is the trap stiffness of the first optical trap; and deriving at least one microrheological magnitude of the medium from the corresponding values of the two temporal series $F(t)$ and $xp(t)$.

In a second aspect, a device for performing such a method comprises an optical setup configured to produce optical traps acting on a particle, said optical setup comprising a single laser source suitable to generate a single laser beam, and a photodetector configured to deliver voltage signals proportional to the beam deflection.

Further advantages, properties, aspects and features of the present disclosure may be derived from the below-described examples. The above-described features and/or the features disclosed in the claims and/or in the following description of examples can, if required, also be combined with one another even if this is not expressly described in detail.

BRIEF DESCRIPTION OF DRAWINGS

The appended drawings are two graphs related to rheological properties of a polyacrylamide gel.

DETAILED DESCRIPTION

Figure 1:
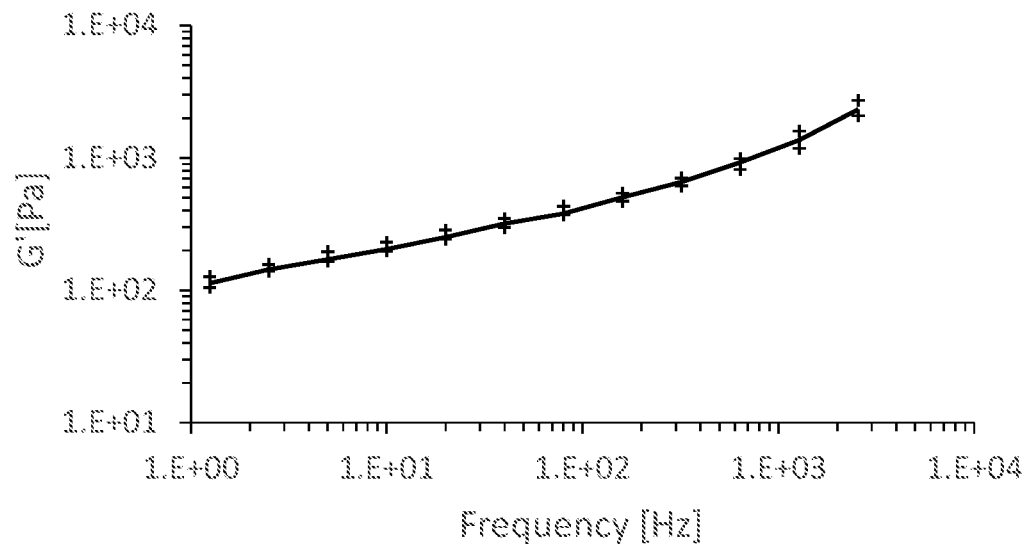
FIG. 1 is a graph that provides information about the viscoelasticity of the viscoelastic medium, that is, how it deforms and flows under stress; the real part G' of the complex shear modulus G* describes the elasticity.
Figure 2:
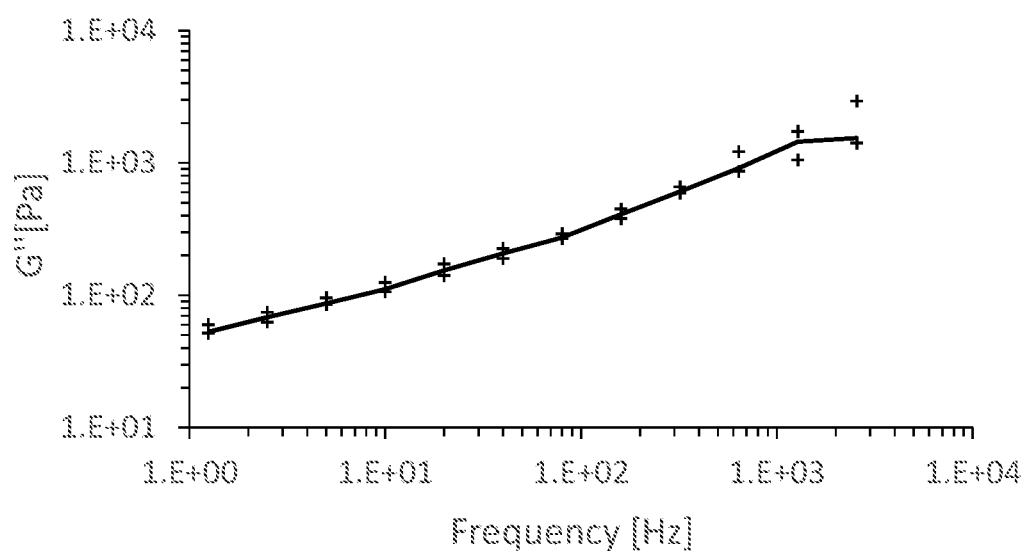
FIG. 2 is a graph that provides information about the viscoelasticity of the viscoelastic medium, that is, how it deforms and flows under stress; the imaginary part G" of the complex shear modulus G* describes the viscosity.

Optical traps coupled with BFPI measurements can help in characterizing rheological properties of soft materials. Rheology deals with the study of deformation and flow of soft materials. This is particularly interesting for the mechanical characterization of cells, polymers, gels and any other material that behaves as both an elastic material (conservative) and a viscous material (dissipative). The elastic behavior of an elastic material is represented by two second-order tensors, the strain tensor ε and the stress tensor σ, that are connected to each other by Hooke's law involving a fourth-order tensor usually called elasticity tensor. In case of soft materials, a number of assumptions are made to simplify the problem. In biology, soft materials are considered incompressible and the elastic share modulus and the Young modulus are connected by a known factor. Normally the mechanical anisotropy is considered only statically and by using simple models, like the transversely isotropic fiber model, which is characterized by tree independent parameters. When the studies are performed dynamically, in to observe the effect of the dissipative part of the material, the approach is simplified further and becomes similar to the one used to characterize viscous isotropic liquids.

In the method described hereinafter, a particle trappable by an optical trap is embedded in a viscoelastic medium that needs characterizing and a force F is applied to the particle by moving the optical trap along one of the principal axes x or y (axis z is the propagation direction of the focused trapping beam).

The particle is considered to move collinearly to the force. The scalar functions F(t) and xp(t) correspond to the scalar vector components Fx(t) or Fy(t) and xp(t) or yp(t) of the force and the particle displacement vectors, respectively. The medium shear modulus G becomes a scalar temporal function that connects the displacement of the particle xp(t) to the Force F(t) by the integral equation $p\cdot\int G(t-t')\cdot xp(t') dt'=F(t)$, where p is a constant depending on the geometry (shape) of the probe ($p=6 \pi R$ for a spherical particle of radius R).

Sometimes it is convenient to use the linear response function X(t) in place of the shear modulus function, because the latter describes the causal connection between the force applied to the particle F(t) and its displacement xp(t): $xp(t)=\int X(t-t')\cdot F(t')\cdot dt'$, where \int\ means 'integral'.

The connection between the two functions G(t) and X(t) is clear in the Fourier space, where $G^*(\omega)\cdot X^*(\omega)=1/p$, G* and chi* being complex functions of frequency ω.

There are mainly three standard tests used in microrheological studies. Two work in the time domain and one works in the frequency domain. The tests performed in the time domain are: (i) the creep test, where a force $F(t)=F\cdot H(t)$ (H(t) is the Heaviside step function) is applied to the particle and the time behavior of the displacement of the particle allows to compute the creep function $J(t)=-\int X(t-t')\cdot dt'$; (ii) the stress relation test, where a step displacement is imposed to the particle, $xp(t)=x0\cdot H(t)$, and the time behavior of the force is related to the shear modulus function by the equation $F(t)/p^*x0=\int G(t-t')\cdot dt'$.

To study the physical properties of the viscoelastic medium in the time domain, simple models like the Kelvin-Voigt are used to fit the functions J(t) and F(t) by varying the searched parameters. In the simplest case (Kelvin-Voigt) the parameters are just two, the elasticity and the viscosity.

For studies made in the frequency domain, the displacement xp(t) of the particle is measured under the effect of an external oscillating force, $F(t)=F\cdot\sin(\omega\cdot t)$, and the complex response function $X^*(\omega)=p\cdot xp^*(\omega)/F^*(\omega)$, or, alternatively, the complex shear modulus, $G^*(\omega)=F^*(\omega)/(p\cdot xp^*(\omega))$ of the medium can be determined, where $xp^*(\omega)$ and $F^*(\omega)$ are obtained by the Fourier transform of the time depending signals xp(t) and F(t), respectively.

These magnitudes provide information about the viscoelasticity of the medium, that is, how it deforms and flows under stress. Roughly speaking, the real part $G'=Re\{G^*\}$ describes the elasticity whereas the imaginary part $G''=Im\{G^*\}$ describes the viscosity.

Optical tweezers allow to measure particle displacements while exerting external forces on the particle and they can be a useful tool to characterize materials (mediums) with rheological properties within the range of G* attainable with the technique. Typical values addressable with optical traps go from tens of Pa to kPa. The force applied by an optical trap is usually limited to some hundreds of piconewtons (depending on the maximum power of the laser) and the upper value of the measured G* is determined by the capability of the system to detect increasingly smaller displacements of the particle (tracer) when the medium gets stiffer.

For soft materials or single molecule studies, a single trap is used to exert a force F(t) on the particle and to determine the displacement of the particle xp(t). It suffices to use the displacement of the laser focus xl(t) and the applied force F(t) to compute the displacement xp(t) of the particle by using the (scalar) stiffness k of the trap. In fact, it is easy to show that xp(t)=xl(t)−F(t)/k.

The upper values of G* reachable with this approach is limited to materials with shear modulus of tens of Pa. This is because xl(t) became rapidly orders of magnitude larger than x(t) and the error introduced by the difference between xl(t) and F(t)/k becomes too large to give accurate results. However, this approach is largely used with configurations using several optical traps acting on different particles starting from a single laser source as described above. In the literature related with rheological studies, the different optical traps always act on different particles in order to study the viscoelastic properties of the medium embedding them.

For stiff or relatively stiff materials, a second laser, commonly called detection laser, is usually introduced just to measure directly and precisely the particle displacement xp(t) with a generic BFPI procedure. The resulting setup includes two laser beams generated by two independent laser sources and having different wavelengths, one being a powerful laser, typically a 1064 nm laser, for manipulating the sample, i.e. to generate the force F, and the other being a much weaker detection laser working at a different wavelength. It is commonly believed in the art that the power of the detection laser should very low and that the two lasers should work at different wavelengths, so that to physically decouple the measurement of the force F(t) from the measurement of the displacement xp(t).

However, the present inventors have found out that this common believe is not true, specially for stiff materials. The key is having a direct access to the particle displacement xp(t) without having to know the optical trap displacement xl(t). And the coupling of the two lasers can be actually not critical for the accuracy of the force measurements, as explained below.

In the method disclosed hereinafter, two optical traps generated by the same laser source are used, one to measure the position xp(t) and both to exert the external force F(t) on the particle. This method can reach an accuracy comparable to that attainable with the above-described laser detection method in case of stiff materials.

The known laser detection method allows measuring complex shear modulus in the kPa range because displacements of the particle of nanometer order can be detected. However, this setup has several important drawbacks. An important limitation is that, due to the utilization of two laser sources, both lasers must be perfectly aligned on the particle so that the detector signals are proportional to the particle displacement for all the displacements that the particle will undergo during the microrheological study. This entails a very accurate optical alignment as well as the capability of centering both lasers on the optical center of the probe, particularly when the particle cannot naturally fall in the bottom of the potential trapping well due to the confinement effect produced by the elastic component of the medium.

The fact that the presently disclosed method produces two optical traps starting from a single laser beam makes the optical alignment of the resulting setup much easier. The two optical traps naturally focus on the same (x, y) plane. The devices used to produce the two optical traps can be a light deflecting device which steers the laser beam between two positions, creating the effect of two permanent traps, or any kind of polarization beam splitters followed by at least one galvanic mirror to deflect at least one of the polarized beams to a second position.

To work properly, the present method assumes that the shear modulus of the particle on which the two optical traps are focused is orders of magnitude larger than the shear modulus of the medium in which the particle is embedded or suspended, the viscoelasticity of which is the object of the microrheological study. This to avoid that the internal deformation of the particle is superposed to the displacement of the center of mass of the particle and perturbs the mathematical decoupling of F(t) and x(t). For instance, the shear modulus of the particle may be 10, 100, or 1000 times higher than the (real) shear modulus of the medium. Or the particle may be a rigid body.

By using the improved BFPI procedure, two voltage signals $V1(t)$ and $V2(t)$ proportional to the forces exerted independently by Trap1 (first optical trap) and Trap2 (second optical trap) on the same particle are obtained: $F1(t)=a1 \cdot V1(t)$ and $F2(t)=a2 \cdot V2(t)$, respectively. $V1(t)$ and $V2(t)$ are either the pair of scalar vector components $V1x(t)$, $V2x(t)$ or $V1y(t)$, $V2y(t)$ depending on whether the force is exerted along axis x or axis y, respectively. The proportionality constant $a1=a2=a$ can be considered the same after the right calibrations between the two raw signals. In general a depends on the shape of the particle and on its optical properties, and also on those of the medium in which the particle is embedded.

If a time-sharing technique is used to produce the two optical traps, it is sufficient to use a single photodetector synchronized with the signal used to switch the position of the laser to separate the two signals. To obtain the same proportionality constant, the two raw instant signals $V1'(t)$ and $V2'(t)$ have to be averaged over the time-sharing cycle.

In case of using the polarization technique, two photodetectors equipped with respective polarization filters are necessary to extract $V1'(t)$ and $V2'(t)$. The difference in the intensity profile of the two polarized traps, in the electronics transconductance and in the optical transmission of the two back-focal-plane interferometers makes the raw proportionality constants a1' and a2' to be different. However, it is sufficient to re-normalize $V1(t)=V1'(t) \cdot a1'/a2'$ and consider $V2(t)=V2'(t)$ unchanged to get the same proportionality $a=a1=a2$ constant for the two signals $V1(t)$ and $V2(t)$.

Before starting the data acquisition, Trap1 is positioned on the optical center of the particle, i.e., on the bottom of the trapping potential well, where no external forces due to the presence of the trap act on such point (optical center). The trapping potential well is defined in the 3-dimensional space. Its centering in the (x, y) trapping plane and in the z axis has to be treated in different ways, as explained below.

Once Trap1 is centered, Trap2 is moved inside the particle to the same position than Trap1. Then Trap2 is moved out of the optical center in such a way to generate a net external force F(t). In case of frequency domain studies, Trap2 starts oscillating around the optical center crossing it periodically and producing a harmonic displacement of the particle at frequency ω, while Trap1 is held fixed. After having waited a transitory time, the signals $V1(t)$ and $V2(t)$ delivered by BFPI are acquired. The external force applied on the particle by the two optical traps, Trap1 and Trap2, is just the sum of the two contributions F1 and F2. It follows that $F(t)=a \cdot (V1(t)+V2(t))$.

The particle displacement xp(t) can be deduced directly from the signal of Trap1: $xp(t)=-x(t)=-F1(t)/k=-a \cdot V1(t)/k$, where k is the Kx or Ky trap stiffness of Trap1. This is because, once centered, Trap1 stays fixed with respect to the optical tweezer system, and so the particle displacement xp(t) corresponds to the position of the optical center of the particle with respect to the position of Trap1. Since the signal x(t) is the position of Trap1 with respect to the optical center of the particle, it follows that xp(t)=−x(t).

In case of frequency domain studies, once the two signals $V1(t)$ and $V2(t)$ are acquired and their respective Fourier transforms $V1^*(\omega)$ and $V2^*(\omega)$ are obtained, the complex shear modulus $G^*(\omega)$ is computed with the equation $G^*(\omega) = -F^*(\omega)/(p \cdot x^*(\omega)) = -k \cdot (V1^*(\omega) + V2^*(\omega))/(V1^*(\omega) \cdot p)$.

It should be noted that the complex shear modulus obtained following the disclosed method does not depend on the proportionality constant a between the signals and the forces exerted by the optical traps. With the generic BFPI procedure, the validity of constant a is limited to the linear region of the trap stiffness k, whereas the improved BFPI procedure, which delivers a direct measure of the optical force, makes the above equation for $G^*(\omega)$ valid even when the oscillation of Trap 2 is so large that the relationship between the optical trap displacement and the optical force is not linear. Besides, the improved BFPI procedure delivers the stiffness k of the first optical trap with higher accuracy and in an easier way.

As already mentioned, the capability of the method to place the optical traps at the optical center of the particle is important too. Otherwise, the excitation force F is not collinear with the particle displacement x and the calculated $G^*(\omega)$ results inaccurate.

The optical centering of any of the optical traps is performed in two steps. First, the optical trap is centered on the (x, y) plane where the optical traps are focused and where they can be moved by using AODs or galvanic mirrors. Once centered in the (x, y) plane, the optical trap is centered on axis z by moving a microscope stage or by means of a piezoelectric actuator.

For its (x, y) centering, Trap1 is positioned manually inside the trapping potential well of the particle just by using the microscope image to locate the particle. Once inside the trapping potential well, an automatic algorithm, involving ($V1x$, $V1y$) and the position (x, y) of Trap1, is used to find interactively the local minimum of the potential function. An embodiment of this automatic algorithm uses a feedback loop algorithm that computes the new position (x_new, y_new) of Trap1 by using the measured signal ($V1x$, $V1y$) and the position (x, y) of Trap1. More explicitly, (x_new, y_new)=(x, y)−ki($V1x$, $V1y$), where ki is a tunable constant. This can be considered a practical implementation of a gradient descent algorithm to find a potential minimum. The algorithm is stopped after a maximum of iterations or once the square root of $V1x^2+V1y^2$ becomes smaller than an error value.

Once localized the center of the potential on the (x, y) plane, the z centering is done by maximizing the amplitude of the $V1x^*(\omega)$ signal when Trap1 is performing small oscillations of fixed amplitude along axis x. In is possible to implement a gradient ascent algorithm to find automatically the maximum of $V1x^*(\omega)$. The found z point might not correspond to the z coordinate of the optical center of the particle but, in case of a spherical particle, to its geometrical center or center of mass. However, in case of ray limit approximation, the distance between these two points for spherical particles having radius larger than the wavelength of the laser is only of a few percentage points of the radius of the particle.

The disclosed method presents many advantages over the known ones. In particular, it allows investigating the properties of stiff soft materials with a stiffness of the order of kPa by using a single laser source for the optical tweezer setup, which is used to create two independent traps that scatter through a relatively rigid particle embedded in the medium of interest. And by moving one of the optical traps and combining the signals obtained by BFPI in a simple way, it makes possible to infer with precision the complex shear modulus $G^*(\omega)$ of the medium without needing to use the difficult laser detection technology.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim and shall not be construed as limiting the scope of the claim.

What is claimed is:

1. A method for performing microrheological measurements in a viscoelastic medium by employing at least first and second optical traps acting on a particle located in the viscoelastic medium, comprising the steps of:
   choosing the particle to be stiffer than the viscoelastic medium;
   placing the particle within the viscoelastic medium;
   generating a single laser beam from a single laser source;
   dividing the single laser beam into a first laser beam and a second laser beam;
   producing the first optical trap acting on the particle by focusing the first laser beam on the particle;
   producing the second optical trap acting on the particle by focusing the second laser beam on the particle;
   positioning the first and second optical traps at the optical center of the particle;
   displacing the second optical trap out of the optical center of the particle on a time-dependent motion;
   using back-focal-plane interferometry (BFPI) with a photodetector in order to acquire a first temporal series for a first voltage signal $V1(t)$ representative of a force exerted by the first optical trap on the particle;
   using BFPI with the photodetector to acquire a second temporal series for a second voltage signal $V2(t)$ representative of a force exerted by the second optical trap on the particle;
   computing a force exerted by the first and second optical traps on the particle as the temporal series $F(t)=a \cdot (V1(t)+V2(t))$, where a is a proportionality constant depending on a shape of the particle, on optical properties of the particle and on optical properties of the viscoelastic medium;
   computing a displacement xp(t) of the particle as a temporal series $xp(t)=-a \cdot V1(t)/k$, where k is trap stiffness of the first optical trap; and
   deriving at least one microrheological magnitude of the viscoeleastic medium from the corresponding values of temporal series $F(t)=a \cdot (V1(t)+V2(t))$ and temporal series $xp(t)=-a \cdot V1(t)/k$.

2. The method of claim 1, wherein the at least one microrheological magnitude of the viscoelastic medium is the complex shear modulus $G^*$.

3. The method of claim 2, further comprising the step of establishing a tridimensional reference frame (x, y, z) centered on the optical center of the particle, where axis z is the propagation direction of the focused single laser beam producing the first optical trap and axes x and y are naturally defined by the orientation of an intensity profile of the single laser beam, wherein the positioning of the first or second optical trap at the optical center of the particle comprises moving the anyone of the first and second optical trap on the plane (x, y) and then moving the first trap or second trap moved on the plane (x,y) along axis z.

4. The method of claim 3, wherein the photodetector is oriented so that the BFPI procedure delivers two voltage signals V1x(t) and V1y(t) representative of the force exerted by the first optical trap, the values V1x and V1y being proportional to the respective displacements x and y of the first optical trap on the plane (x, y).

5. The method of claim 2, further comprising the steps of:
displacing the second optical trap on an oscillatory motion of a frequency ω centered at the optical center of the particle;
obtaining a first complex function of ω as a Fourier transform of F(t), the first complex function being termed F*(ω);
obtaining a second complex function of ω as a Fourier transform of xp(t), the second complex function being termed xp*(ω);
computing a complex function for the shear modulus G* of the viscoelastic medium through the equation G*(ω)=F*(ω)/(p·xp*(ω)), where p is a constant depending on the shape of the particle.

6. The method of claim 2, further comprising the steps of:
displacing the second optical trap on an oscillatory motion of a frequency ω centered at the optical center of the particle;
obtaining a first complex function of ω as a Fourier transform of V1(t), the first complex function being termed V1*(ω);
obtaining a second complex function of ω as a Fourier transform of V2(t), the second complex function being termed V2*(ω);
computing a complex function for the shear modulus G* of the medium through the equation G*(ω)=−k·(V1*(ω)+V2*(ω))/(p·V1*(ω)), where p is a constant depending on the shape of the particle.

7. The method of claim 6, further comprising the step of establishing a tridimensional reference frame (x, y, z) centered on the optical center of the particle, where axis z is a propagation direction of the focused single laser beam producing the first optical trap and axes x and y are naturally defined by the orientation of an intensity profile of the single laser beam, wherein the positioning of the first or second optical trap at the optical center of the particle comprises moving anyone of the first and second optical trap on the plane (x, y) and then moving the first trap or second trap moved on the plane (x,y) along axis z.

8. The method of claim 7, wherein the photodetector is oriented so that the BFPI procedure delivers two voltage signals V1x(t) and V1y(t) representative of the force exerted by the first optical trap, the values V1x and V1y being proportional to the respective displacements x and y of the first optical trap on the plane (x, y).

9. The method of claim 8, wherein the moving of the first or second optical trap along axis z comprises the step of maximizing the amplitude of the Fourier transform V1*(ω) of V1x(t) by having the first optical trap to perform different sets of fixed amplitude oscillations along axis X.

10. The method of claim 1, wherein the particle is chosen to have a shear modulus at least 100 times higher than the real shear modulus of the viscoelastic medium.

11. The method of claim 1, wherein the single laser beam is divided into the first and second laser beams by an acousto-optic deflector (AOD).

12. The method of claim 1, wherein a polarization beam splitter divides the single laser beam into first and second polarized beams, the second laser beam being produced by a galvanic mirror that deflects one of the first and second polarized beams to the position of the second optical trap, and the first laser beam being the other polarized beam either deflected or not deflected but anyway directed to the position of the first optical trap.

13. The method of claim 1, further comprising the step of establishing a tridimensional reference frame (x, y, z) centered on the optical center of the particle, where axis z is a propagation direction of the focused single laser beam producing the first optical trap and axes x and y are naturally defined by the orientation of an intensity profile of the single laser beam, wherein the positioning of the first or second optical trap at the optical center of the particle comprises moving anyone of the first and second optical trap on the plane (x, y) and then moving the first trap or second trap moved on the plane (x,y) along axis z.

14. The method of claim 13, wherein the centering of the first or second optical trap on the plane (x, y) involves the steps of:
placing the viscoelastic medium with the particle in an optical train of an optical microscope;
using a microscope image of the particle within the viscoelastic medium to locate the particle and position anyone of the first and second optical trap inside the trapping potential well of the particle manually; and
applying a feedback loop algorithm to compute a new position of the first optical trap or second optical trap positioned in the trapping potential well of the particle having a lower potential than the preceding position of the particle.

15. The method of claim 14, wherein the feedback loop algorithm is a gradient descent algorithm to find a potential minimum.

16. The method of claim 13, wherein the photodetector is oriented so that the BFPI procedure delivers two voltage signals V1x(t) and V1y(t) representative of the force exerted by the first optical trap, the values V1x and V1y being proportional to the respective displacements x and y of the first optical trap on the plane (x, y).

* * * * *